United States Patent [19]

Askwith et al.

[11] 4,364,261

[45] Dec. 21, 1982

[54] MULTI-MEDIA LEAK TEST APPARATUS

[75] Inventors: Herbert Askwith, West Palm Beach; Larry Sage, North Palm Beach, both of Fla.

[73] Assignee: N.E.R.G. Enterprises, Inc., Riviera Beach, Fla.

[21] Appl. No.: 247,608

[22] Filed: Mar. 25, 1981

[51] Int. Cl.³ .............................................. G01M 3/32
[52] U.S. Cl. .......................................... 73/40; 73/49.2
[58] Field of Search ................................... 73/40, 49.2

[56] References Cited

U.S. PATENT DOCUMENTS

| 2,771,769 | 11/1956 | Nielsen | 73/40 |
|---|---|---|---|
| 2,874,566 | 2/1959 | Mastak | 73/49.2 X |
| 2,912,852 | 11/1959 | Trinneer | 73/49.2 |
| 3,331,237 | 7/1967 | Strang | 73/40 |
| 3,494,178 | 2/1970 | Tuttle | 73/49.2 |
| 3,813,922 | 6/1974 | Oswald et al. | 73/49.2 |
| 3,827,283 | 8/1974 | Lerner et al. | 73/40 |
| 3,872,712 | 3/1975 | Westervelt et al. | 73/49.2 X |

Primary Examiner—Edward R. Kazenske
Assistant Examiner—Joseph W. Roskos
Attorney, Agent, or Firm—Clarence F. Stanback, Jr.

[57] ABSTRACT

A leak testing device capable of detecting and measuring gas and water leakage in valves and other parts of pressurized pneumatic and hydraulic systems is disclosed. Gas from a pressurized source is injected into the apparatus of the device and is adjusted to the desired pressure. The flow of pressurized gas is routed into either the gas test section or the water test section of the device. The test media is then routed through the proper range flow meter of the device and then through tubing into the apparatus or system to be tested for leakage. The amount of leakage will be equal to and can be measured by the reading on the flow meter instrumentation.

8 Claims, 5 Drawing Figures

MULTI-MEDIA LEAK TEST APPARATUS

BACKGROUND OF THE INVENTION

1. Field of the Invention

This invention relates generally to leakage rate testing apparatus for detecting and measuring the amount of leakage in a specific portion of a pneumatic or hydraulic system subjected to a predetermined test pressure, and relates more particularly to leakage rate testing apparatus capable of measuring the leakage of either gas or water from the system using a single pressure source.

2. Description of the Prior Art

Prior to use in many applications, valve and piping systems must be leak tested. Generally, these tests are performed by using either air, nitrogen or water although other test media may be used. During the test, the magnitude of the leakage may vary over a large range. Moreover, test pressures may have a range up to 2,500 pounds per square inch. Consequently, the performance of test covering the foregoing range of test medias, leak rates and pressures require the use of several different instruments.

OBJECTS OF THE INVENTION

A principle object of the present invention is to provide an efficient, accurate and precise device capable of measuring leakage in a variety of pressurized systems.

A further object of the present invention is to provide a method and apparatus for rapidly and accurately measuring leakage rates in a pressurized water system without draining the system.

A still further object of the present invention is to provide a device capable of obtaining leakage measurements for both gas and water in one apparatus and using a single source of pressure.

Another object of the present invention is to provide a sensitive testing device that is compact, lightweight and portable and can be used in substantially all areas of most pressurized systems.

It is another object of the present invention to provide a device capable of obtaining leakage measurements over a wide range so that even small leaks can be detected and measured accurately.

It is still another object of the present invention to provide a leak testing device capable of both gas and water leakage measurements which is quickly, easily and reliably connected to and disconnected from the part of the system to be tested.

Yet another object of the present invention is to provide a leak testing device adaptable for use with any of a variety of flow meters while still using the same circuit components.

Still another object of the present invention is to provide a leak testing device capable of detecting and measuring leaks and leakage rates in both hydraulic and pneumatic systems of low and elevated pressures.

It is yet another object of the present invention to provide a leak testing device capable of checking the calibration of the flow meters.

It is still further another object of the present invention to provide a leak testing device capable of verifying the closure of check valves during flow reversal through the system.

SUMMARY OF THE INVENTION

The foregoing objects are accomplished through the use of leakage rate testing, equipment that consolidates, into a single, highly adaptable piece of equipment, separately by several different instruments.

Briefly, the leakage rate testing equipment of this invention is designed to allow leakage testing of valves and piping systems using either gas (air, nitrogen, or other nonflammable gas) or water (or some other clear liquid) by determining the actual flow rate. Moreover, this invention is designed to accommodate a range of flows in excess of 500:1 at any pressure above atmospheric or up to 2,500 pounds per square inch. By incorporating both gas and water capabilities in a single apparatus, comparative values can be easily obtained. Determining leakage by actual flow rate is preferable to other methods (e.g., pressure decay, tracer gas) in both accuracy and ease of measurement for the range of flows covered.

During leak testing, gas from a pressurized source is injected into the leakage rate testing equipment and the gas is adjusted to the desired pressure by a pressure regulator. A three-way valve is positioned to route the flow of pressurized gas into either the gas test section or the water test section of the equipment. The test media is then routed through a preselected range flow meter of the equipment and then through tubing into the apparatus or system to be tested for leakage. The reading on the range flow meter equals the amount of leakage.

The foregoing and their objects, features and attendant advantages of the invention will be apparent from the following more particular description of the preferred embodiment of the invention as illustrated in the accompanying drawings.

DESCRIPTION OF THE PREFERRED EMBODIMENT

Figure 1:
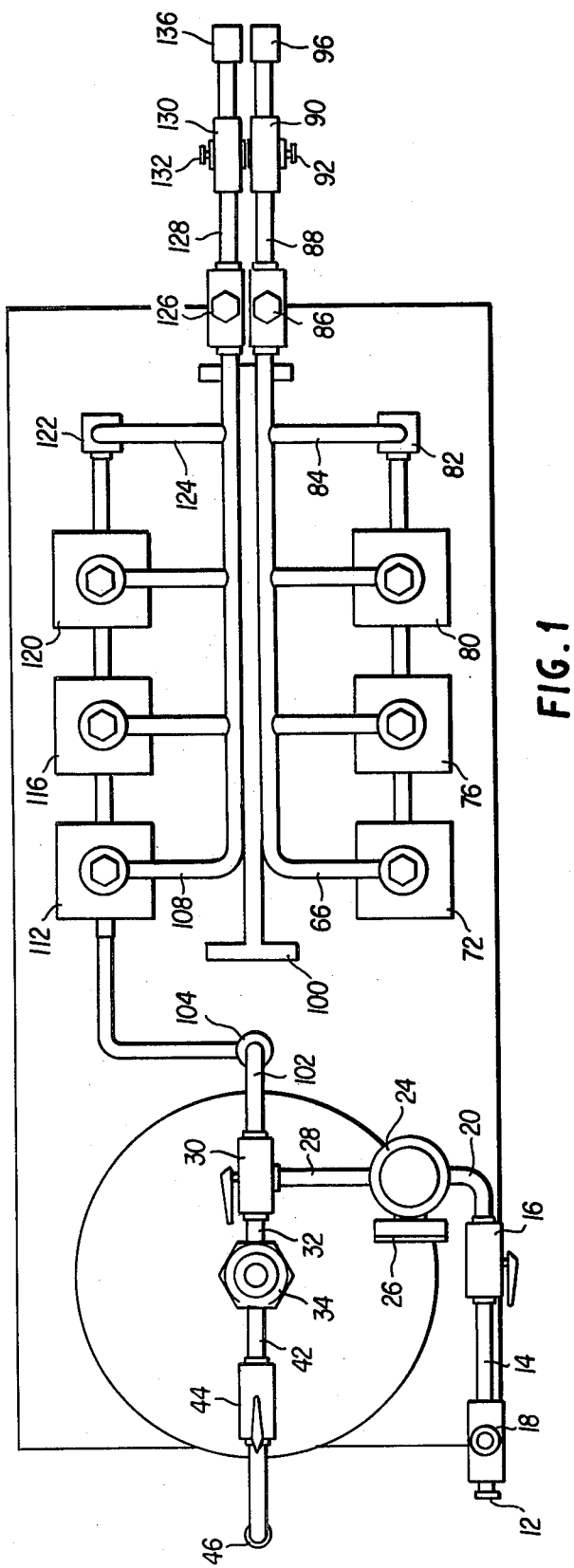
FIG. 1 is a diagrammatical top view of the apparatus of the present invention showing the relationship of the various components.
Figure 2:
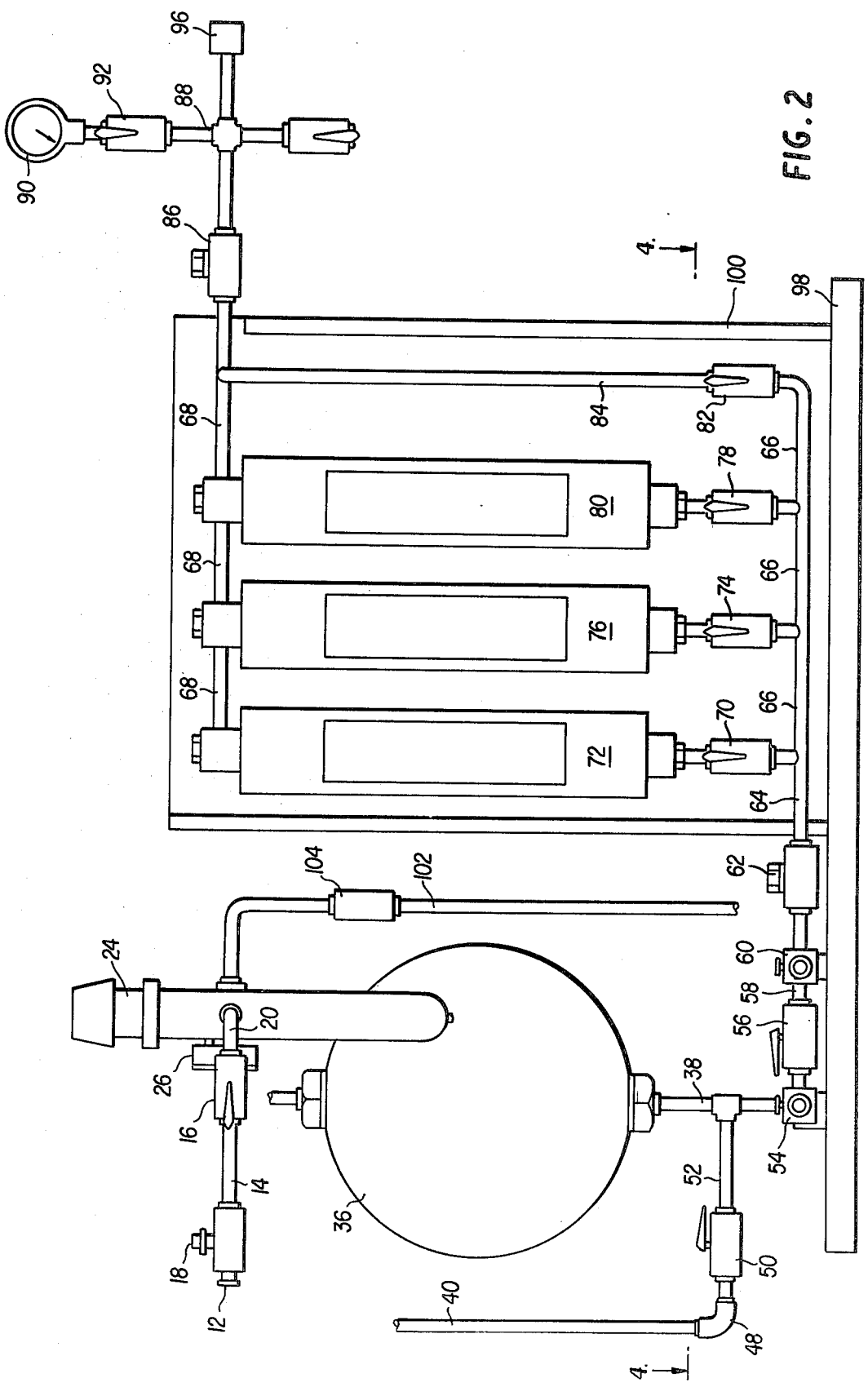
FIG. 2 is a diagrammatical side view of the apparatus of FIG. 1 showing the gas supply inlet, the pressure regulator and the water test section thereof.

In FIGS. 1 and 2, a source of pressurized gas (not shown) is attached to the inlet connection 12. (The gas source may be air, nitrogen, or bottled compressed gas. In addition, the gas source must have a pressure greater than the pressure at which the test is to be run.) The pressurized gas flows through inlet connection 12 and then through pipe 14 to inlet isolation valve 16. The self-contained vent valve 18, used to relieve the incoming gas pressures when desired, is mounted to pipe 14. Opening inlet isolation valve 16 allows the pressurized gas to flow through pipe 20 and then through inlet air filter 22 into pressure regulator 24. The incoming gas is adjusted to a desired pressure under the control of pressure regulator 24 and this pressure is measured on supply pressure gauge 26. The pressure regulator 24 supplies gas at the required pressure through pipe 28 to three-way valve 30. Valve 30 can be positioned to route the pressurized gas to either the gas test section or the water test section of the apparatus.

Figure 3:
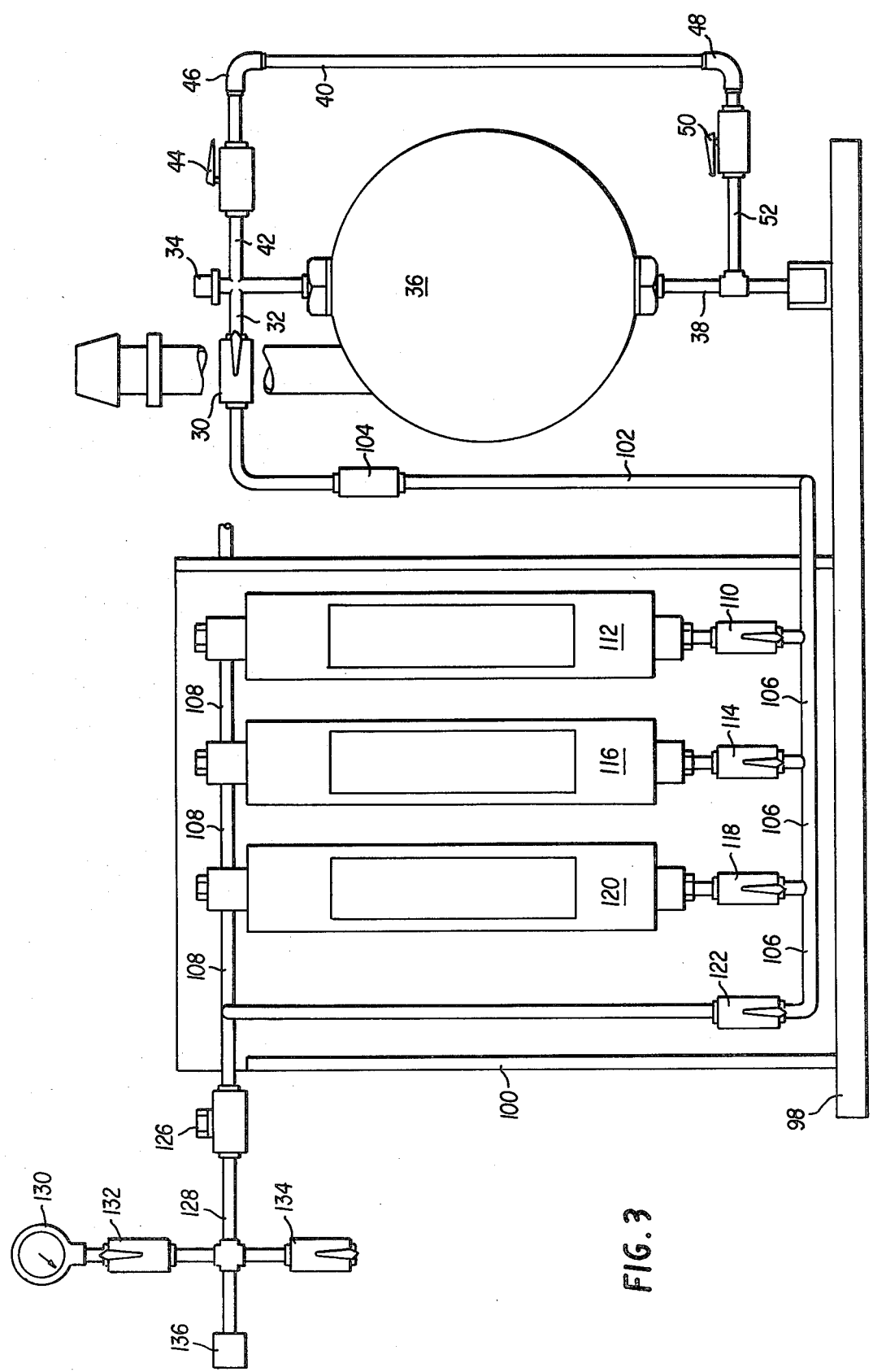
FIG. 3 is a diagrammatical view of the other side of the apparatus of FIG. 1 showing the three-way valve, the water reservoir tank and the gas test section thereof.
Figure 4:
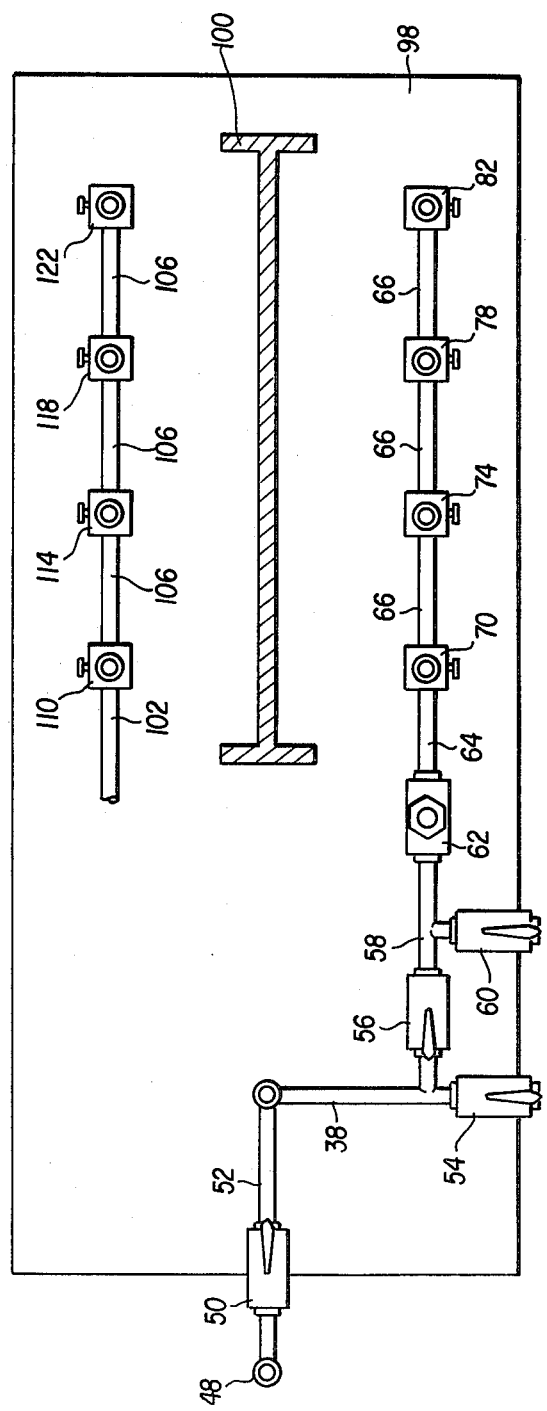
FIG. 4 is a diagrammatical view of the apparatus of the present invention taken through line 4—4 of FIG. 2.

Referring to FIGS. 1 and 3, when the three-way valve 30 is positioned to the water test section, the pressurized gas flows into pipe 32. The self-contained vent valve 34, used to relieve pressure in the water test section when desired, is mounted to pipe 32. The pressurized gas flows through pipe 32 into the water reservoir tank 36 which is partially filled with water from a water source (not shown). The pressurized gas pressurizes the water causing a portion of it to flow from the water reservoir tank 36 into pipe 38 which is shown in FIGS. 2 and 3. Water level in the water reservoir tank 36 is monitored by use of a sight glass 40 connected between pipe 32 and pipe 38 by a sight glass assembly. The sight glass assembly begins with pipe 42 connected to pipe 32 and is composed of pipe 42, isolation valve 44, connector 46, sight glass 40, connector 48, isolation valve 50, and pipe 52 which is connected to pipe 38. In FIG. 2, drain valve 54, mounted to pipe 38, is used to drain water reservoir tank 36.

The pressurized water flows through pipe 38 and then through water reservoir tank isolation valve 56 into pipe 58 as seen in FIG. 2. The water fill valve 60, used to fill water reservoir tank 36, is mounted to pipe 58. The pressurized water flows through pipe 58 into water filter 62 which is used to keep particulate impurities from clogging. The water flows from water filter 62 through pipe 64 into the water test section inlet manifold 66. The pressurized water from water test section inlet manifold 66 is directed into the water test section outlet manifold 68 by either opening control valve 70 through low range water flow meter 72, or by opening control valve 74 through medium range water flow meter 76, or by opening control valve 78 through high range water flow meter 80, or by opening control valve 82 through bypass pipe 84. Leakage is measured by reading the indication on the appropriate flow meter 72, 76 or 80.

The flow meters described above are variable area type rotometers, however, other types of volumetric or mass flow meters, having the proper range and compatible with the test media, may be substituted. The pressurized water flows from the water test section outlet manifold 68 through the back flow prevention check valve 86 and then through the pipe 88. Outlet pressure gauge 90, used to monitor outlet water pressure, and associated instrument isolation valve 92 are mounted to pipe 88. Water outlet drain valve 94, used to relieve outlet water pressure when required, is also mounted to pipe 88. The pressurized water flows through pipe 88, through female quick disconnect 96 and then through outlet tubing (not shown) to the item being test (not shown) at a rate equal to the leakage being measured.

As illustrated in FIGS. 2 and 3, the foregoing apparatus is attached and secured to a base 98 by the use of bolts. In addition, the apparatus is supported and stabilized by a frame 100 to which it is attached and secured by bolts.

Referring to FIGS. 1 and 3, when the three-way valve 30 is positioned to the gas test section, the pressurized gas flows through pipe 102. The self-contained vent valve 104, used to relieve pressure in the gas test section when desired, is mounted to pipe 102. The pressurized gas flows through pipe 102 into the gas section inlet manifold 106. The pressurized gas from the gas section inlet manifold 106 is directed into the gas section outlet manifold 108 by either opening control valve 110 through low range gas flow meter 112, or by opening control valve 114 through medium range gas flow meter 116, or by opening control valve 118 through high range gas flow meter 120, or by opening control valve 122 through bypass pipe 124. Leakage is measured by reading the indication on the appropriate flow meter 112, 116, or 120.

The flow meters described above are variable area type rotometers and are like flow meters 72, 76 and 78, however, other types of volumetric or mass flow meters, having the proper range and compatible with the test media, may be substituted. The pressurized gas flows from the gas section outlet manifold 108 through the back flow prevention check valve 126 into pipe 128. Outlet pressure gauge 130, used to monitor outlet gas pressure, and associated instrument isolation valve 132 are mounted to pipe 128. Gas outlet drain valve 134, used to relieve outlet gas pressure when required, is also mounted to pipe 128. The pressurized gas flows through pipe 128, through quick disconnect 136 and then through outlet tubing (not shown) to the item being tested (not shown) at a rate equal to the leakage being measured.

Based upon the foregoing, the basic components of the leak testing device are the pressure regulator, water reservoir tank, water flow meters and gas flow meters. The pressure regulator 24 is isolatable and is provided with an in-line filter 22 to trap any contaminants in the gas supply. The pressure gauge 26 indicates the regulator setting. The vent 18 allows the gas supply to be disconnected while maintaining pressurization of the device.

Gas from the pressure regulator may be routed to either the gas or water sections of the device by using the three-way valve 30. If the gas is routed to the gas section, it can either pass through the bypass pipe 124 or one of the gas flow meters 112, 116 or 120. Although three flow meters are shown, any number of meters may be added or subtracted to extend or decrease the range of flows measured. Test pressure is indicated on the outlet pressure gauge 130.

During an actual leak test, the test volume is pressurized first using the bypass pipe 124 until the desired test pressure is seen on the outlet pressure gauge 130. The pressure regulator 24 is adjusted if necessary. Thereafter, the bypass is closed and the appropriate flow meter control valve is opened. The leak rate is read on the appropriate flow meter. After the test is completed, the test volume is depressurized.

If the gas is routed to the water section, it is used to pressurize the water in the water reservoir tank 36. The tank is provided with a sight glass 40 for level indication and with vent 34 and drain connection 54. The gas overpressure is used to force water from the tank into the part under test either via the bypass line 84 or one of the flow meters 72, 76 or 80. As with the gas section, any number of flow meters may be used for the extended or decrease range of the device. All water flowing to the test volume is filtered by the in-line filter 62. The fill connection 60 can be used to either fill the tank or for initial filling of the test volume via the bypass line. The test pressure is read on the outlet pressure gauge 90. When the outlet pressure gauge indicates that the test volume is at the desired test pressure, the bypass is closed and the appropriate flow meter control valve is opened. The pressure regulator may be adjusted to obtain the desired test pressures. If there is a large difference in elevation between the device and the test volume, a supplemental pressure gauge may be used at the test volume. The leak rate is read on the appropriate flow meter and after the test is completed, the test volume is depressurized.

Check valves 86 and 126 are provided on both the water and gas sections, respectively, to reduce the possibility of contaminating the device. Moreover, the invention is designed for compactness to increase portability.

Figure 5:
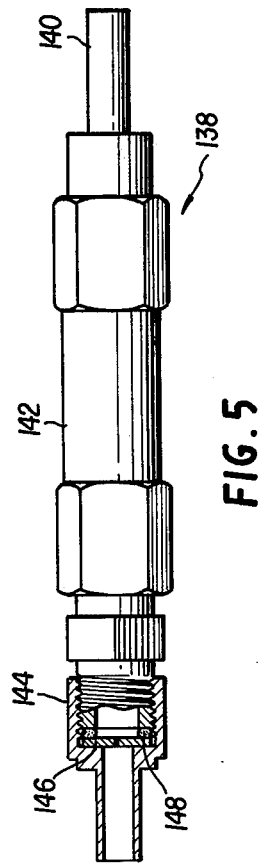
FIG. 5 is an elevational view, partly in section, of the leak simulator assembly of the present invention.

The device of the invention is provided with a number of leak simulator assemblies, as seen in FIG. 5, which may be used at any time to verify the accuracy of the flow meters and to verify the calibration thereof. Each leak simulator assembly 138 includes a male quick disconnect 140 which is used to attach the leak simulator assembly to the device at female quick disconnect 136 associated with the gas test section or at female quick disconnect 96 associated with the water test section. Male quick disconnect 140 is connected to filter 142 which is used to eliminate particulate contaminants which might clog the leak simulator assembly. The filter 142 is attached to the leak simulator holder 144 which contains the leak simulator 146. The leak simulator 146 is a metallic disk with an accurately sized hole having a diameter of 0.0005" or larger passing through the center of the disk. The leak simulator 146 is sealed in the leak simulator holder 144 by an O-ring 148 which serves to prevent the test media from bypassing the hole in the leak simulator.

It is to be understood that one form of this invention has been illustrated and described and that it is not to be limited to the specific form or arrangement of parts herein described and shown except insofar as such limitations are included in the claims. The features of the apparatus may be changed or varied in lesser or greater degree without departing from the essence of the invention defined in the following claims.

What we claim and desire to be secured by Letters Patents of the United States is:

1. Apparatus for detecting and measuring leakage in closed systems, comprising:
   pressure regulating means for adjusting a gas input to the apparatus to a predetermined pressure;
   means for directing the pressurized gas to one of at least two different test sections of said leakage testing apparatus; said at least two different test sections including at least a gas test section and a water test section;
   said gas test section being comprised of:
   a gas section manifold for receiving pressurized gas directed thereto; said gas section manifold having a plurality of channels located therein for the pressurized gas to travel through, and each of said plurality of channels including a control valve and a range flow meter; said plurality of range flow meters providing a plurality of different ranges of flow measurements through said plurality of channels;
   an outlet pressure gauge connected to the output from said gas section manifold for monitoring the pressure of the pressurized gas from said gas section manifold; and
   means for connecting the output from said gas section manifold to a part of said closed system to be tested for leakage and with the rate of leakage from said closed system being indicated on the one of the flow meters that is able to meter the loss of pressurized gas from said closed system and likewise from said leakage testing apparatus;
   said water test section being comprised of:
   a water reservoir tank partially filled with water and receiving said pressurized gas as an input;
   a water section manifold for receiving water forced from said water reservoir tank by said pressurized gas; said water section manifold having a plurality of channels located therein for the pressurized water to travel through and each of said plurality of channels including a control valve and a range flow meter; said plurality of range flow meters providing a plurality of different ranges of flow measurements through said plurality of channels;
   an outlet pressure gauge connected to the output from said water section manifold for monitoring the pressure of the pressurized water from said water section manifold; and
   means for connecting the output from said water section manifold to a part of said closed system to be tested for leakage and with the rate of leakage from said closed system being indicated on the one of the flow meters that is able to meter the loss of pressurized water from said closed system and likewise from said leakage testing apparatus.

2. The apparatus for detecting and measuring leaks as set forth in claim 1, further including a control valve and a bypass valve, in series, for bypassing said pressurized gas around said gas section manifold to directly pressurize said closed system.

3. The apparatus for detecting and measuring leaks as set forth in claim 1, further including a control valve and a bypass valve, in series, for bypassing the pressurized water from said water reservoir tank around said water section manifold to directly fill said closed system with pressurized water.

4. The apparatus for detecting and measuring leaks as set forth in claim 1, further including a sight glass assembly connected between the input and the output of said water reservoir tank for indicating the level of water inside said water reservoir tank.

5. The apparatus of claim 1, wherein the leak detection and measurements are carried out at an elevated pressure.

6. The apparatus of claim 1, wherein said leak detection and measurement apparatus is adaptable for both hydraulic and pneumatic pressure testing of said closed systems.

7. The apparatus of claim 1, wherein the closure of a check valve on the reversal of flow in the system under test may be verified by observing the sudden reduction in flow on the flowmeter.

8. The apparatus of claim 1, further including a leak simulator connected to the output from said gas section manifold or the output from said water section manifold for verifying the accuracy of the flow meters associated with said gas section manifold or said water section manifold; said leak simulator being comprised of a housing encasing a filter and a metallic disk with a hole located in its center of a predetermined diameter; said disk functioning to simulate leak from said closed systems.

* * * * *